(12) United States Patent
Bender et al.

(10) Patent No.: US 7,822,729 B2
(45) Date of Patent: Oct. 26, 2010

(54) SWAPPING MULTIPLE OBJECT ALIASES IN A DATABASE SYSTEM

(75) Inventors: Michael Bender, Rye Brook, NY (US); Bruce A. Fisher, Carmel, NY (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 11/839,388

(22) Filed: Aug. 15, 2007

(65) Prior Publication Data

US 2009/0049022 A1 Feb. 19, 2009

(51) Int. Cl.
*G06F 17/30* (2006.01)
(52) U.S. Cl. ...................................... 707/704
(58) Field of Classification Search .................. 707/704
See application file for complete search history.

(56) References Cited

U.S. PATENT DOCUMENTS

| | | | |
|---|---|---|---|
| 5,418,950 A | 5/1995 | Li et al. | |
| 6,006,230 A | 12/1999 | Ludwig et al. | |
| 6,115,704 A | 9/2000 | Olson et al. | |
| 6,526,399 B1 | 2/2003 | Coulson et al. | |
| 6,560,671 B1 | 5/2003 | Samra et al. | |
| 6,574,639 B2 * | 6/2003 | Carey et al. | 707/704 |
| 7,178,129 B2 | 2/2007 | Katz | |
| 2002/0150240 A1 | 10/2002 | Henson et al. | |
| 2005/0165801 A1 | 7/2005 | Sethi et al. | |

FOREIGN PATENT DOCUMENTS

WO WO2005050481 A1 2/2005

OTHER PUBLICATIONS

Microsoft, Create Procedure (T-SQL), 1998, pp. 1-12.*
Lockwood, Using Stored Procedures to Manage SQL Server Security, Feb. 13, 2003, pp. 1-3.*
Rm command, Jul. 2005, pp. 1-3.*
Mv command, Apr. 2004, pp. 1-3.*
Postel, RFC 765, File Transfer Protocol, 1985, pp. 1-10.*
Kondreddi, Search and Replace SQL Server in all columns of all tables, Jan. 1, 2006, pp. 1-6.*
Howard, The Business Benefits of DB2 9, Jul. 2006, pp. 1-20.*

* cited by examiner

*Primary Examiner*—James Trujillo
*Assistant Examiner*—Albert Phillips
(74) *Attorney, Agent, or Firm*—Dillon & Yudell LLP

(57) ABSTRACT

A novel Structure Query Language (SQL) command globally swaps multiple alias names for multiple objects in a database management system.

16 Claims, 8 Drawing Sheets

SWAPPING MULTIPLE OBJECT ALIASES IN A DATABASE SYSTEM

BACKGROUND OF THE INVENTION

1. Technical Field

The present disclosure relates to the field of computers, and specifically the software that runs on computers. Still more particularly, the present disclosure relates to the managing databases.

2. Description of the Related Art

In the information management space of the database management systems usage, tables/views (objects) often are given alias names, which are used to identify particular objects. Performing the process of pointing the alias to a new table/view in the prior art, and particularly when using Structured Query Language (SQL) commands, requires iterations of multiple commands to drop and create an alias for each alias that is being swapped to a new underlying table/view. In addition, when using SQL, a user cannot guarantee that the multiple aliases will all be changed as a single unit of work.

SUMMARY OF THE INVENTION

A novel Structure Query Language (SQL) command globally swaps multiple alias names for multiple objects in a database management system.

The above, as well as additional purposes, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
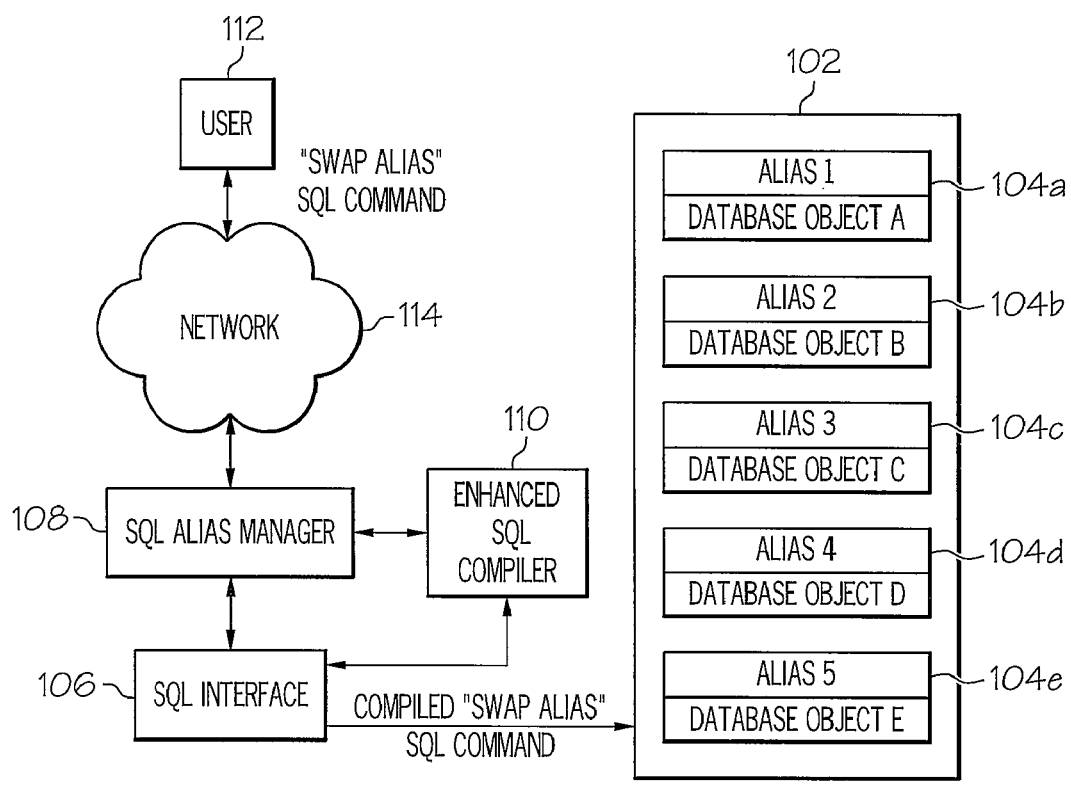
FIGS. 1-2 illustrate a Structured Query Language (SQL) interface coupled to a database management system.

With reference now to the figures, and particularly to FIG. 1, a database management system 102 is presented. In one embodiment, database management system 102 is a DB2 system. Contained within the database management system 102 are multiple database objects 104a-e. Each of the database objects 104a-e are unique, and are initially identified and accessed by a user-defined alias name ("ALIAS 1-ALIAS 5").

In accordance with the present disclosure, a Structured Query Language (SQL) interface 106 is capable of issuing a compiled "Swap Alias" SQL command to globally swap the alias name for all database objects that are listed in the command. As known to those skilled in the art of software, SQL is a computer language designed for the retrieval and management of data in relational database management systems, such as DB2. However, in the prior art, alias name swaps had to be performed by SQL "drop name" and a subsequent SQL "create alias" commands, thus preventing global alias name swaps. The present disclosure overcomes this deficiency in the SQL prior art.

Figure 2:
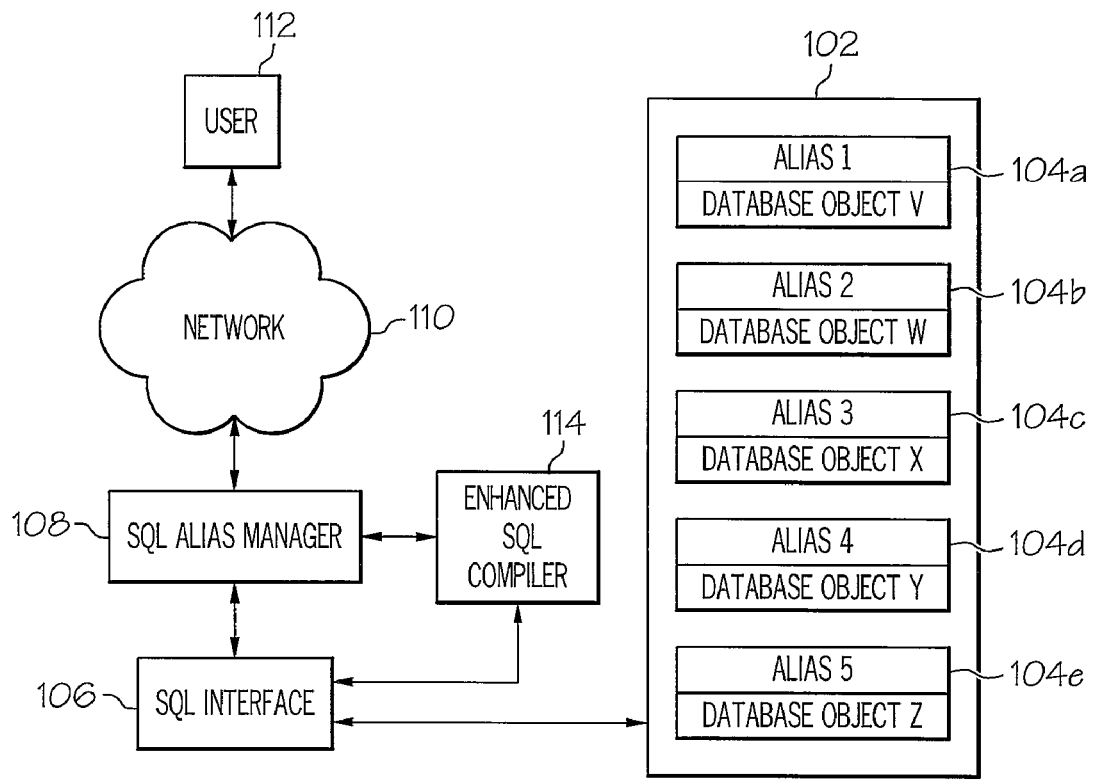
Figure 3:
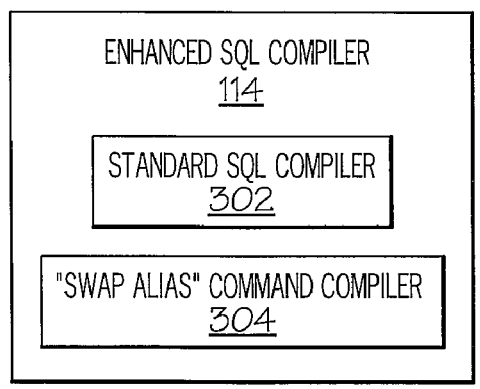
FIG. 3 depicts additional detail for an enhanced SQL compiler that is capable of compiling a "Swap Alias" SQL command.

An SQL alias manager 108 is coupled to an enhanced SQL compiler 110, which is also coupled to the SQL interface 106. The SQL alias manager 108 controls the flow of SQL instructions being sent from a user 112, either locally (in a same computer as the SQL interface 106 and database management system 102) or remotely via a network 114. Assume that the user 112 has sent a global "Swap Alias" SQL command (instruction) to the SQL alias manager 108. This "Swap Alias" SQL command is then sent to the enhanced SQL compiler 110, which sends the compiled "Swap Alias" SQL command to the SQL interface 106 for operation on the multiple database objects 104a-e in the database management system 102. Thus, as shown in FIG. 2, after the compiled "Swap Alias" SQL command is executed, the alias names of some or all of the unique database objects 104a-e have now changed to point to "Database object V-Database object Z." As shown in FIG. 3, the enhanced SQL compiler not only includes logic needed for a standard SQL compiler 302, but also includes a "Swap Alias" command compiler 304, which is capable of compiling the herein-described novel "Swap Alias" SQL instruction. Optimally, the "Swap Alias" command compiler 304 is integrated into the standard SQL compiler 302 to create one new composite compiler (not shown).

Figure 4:
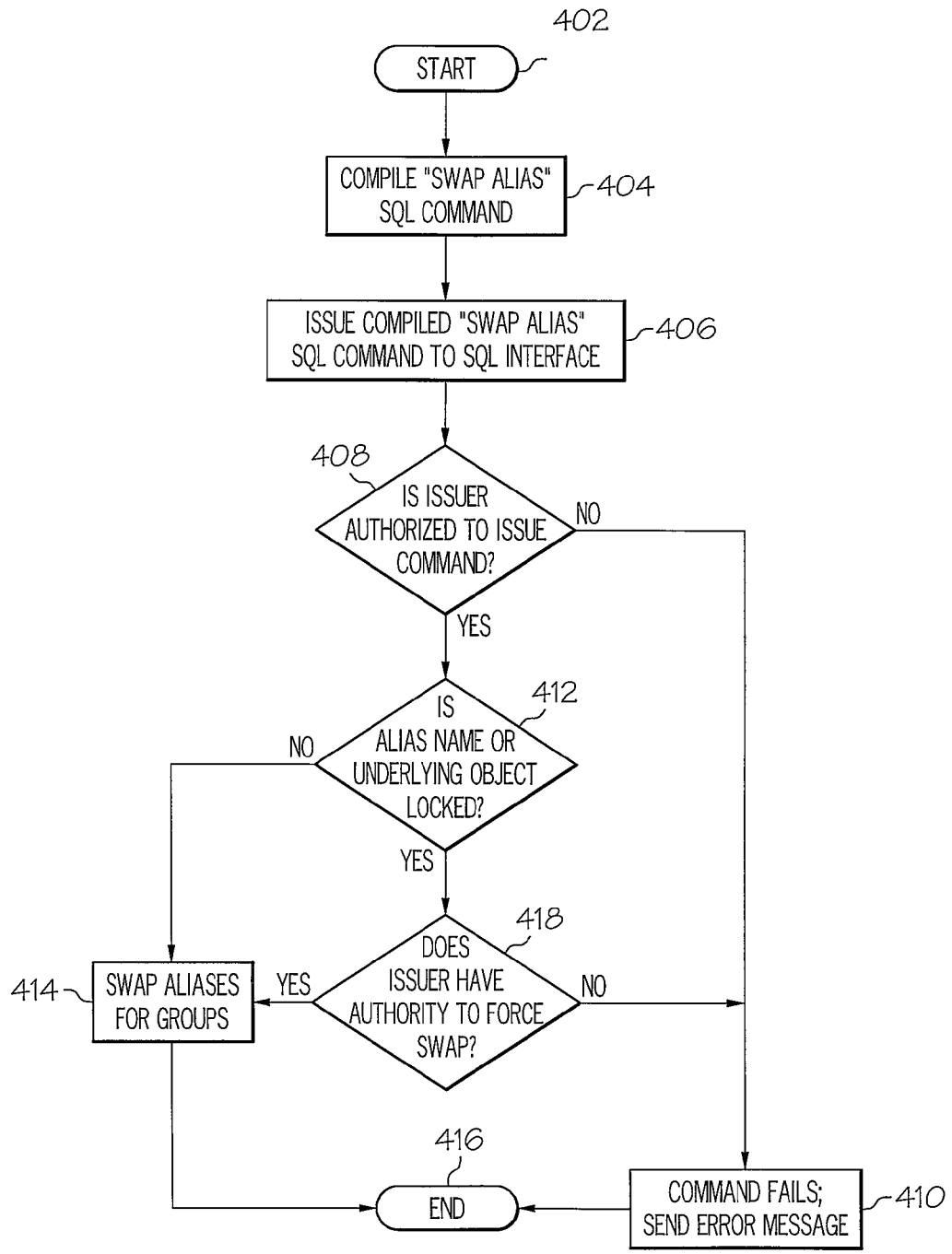
FIG. 4 is a high-level flow chart of steps taken to swap aliases in a database using the "Swap Alias" SQL command.

Referring now to FIG. 4, a flow-chart of exemplary steps taken when using the novel "Swap Alias" SQL instruction is presented. After initiator block 402, which may be prompted by a decision to swap the alias name of multiple objects in a relational database such as DB2, the novel "Swap Alias" SQL command is compiled (block 404). The compiled "Swap Alias" SQL command is then issued to an SQL interface for the relational database (block 406), preferably via an SQL alias manager (i.e., SQL alias manager 108 shown in FIG. 1). A query is then made as to whether the user who issued the "Swap Alias" SQL command is authorized to do so (query block 408). This query is preferably performed by the SQL alias manager 108, shown in FIG. 1. If the issuer is not authorized to use this command, then the command fails, and an error message is sent (block 410) to the user, a supervisor, a remote service, etc. Authorization for the user is determined by any of several means. In one embodiment, the security is assured by the SQL alias manager 108 (shown in FIG. 1) "stripping" off an encrypted identifier for the user 112 from the received "Swap Alias" SQL command, decrypting that user identifier, and then comparing the decrypted user identifier with a list of authorized users' identifiers.

If the user is authorized to utilize the "Swap Alias" SQL command, then a query is made for each object whose alias is to be changed as to whether that object's alias name or the underlying object is locked (query block 412). An alias name may be locked if another user has assumed exclusive control and access over a group of objects in the relational database. If none of the multiple objects' alias names are locked, then the global alias swap occurs for the entire group of objects (block 414), and the process ends (terminator block 416). However, the issuer of the "Swap Alias" SQL command may have the authority to force the alias swap, even for a locked alias or underlying object. If so (query block 418), then the alias swap occurs for all objects in the database that are declared in the "Swap Alias" SQL command, even for some or all of the locked aliases. That is, in one embodiment, all of the instances of the same alias name are swapped out. However, if the issuer of the command does not issue the force option and any of the objects are locked, then none of the objects are changed and an error message is returned. In an alternate embodiment, if the issuer does not issue the force option, then the alias name swap will occur for any unlocked aliases (and/or their underlying objects), but will pass over any locked aliases (and/or underlying objects).

Figure 5:
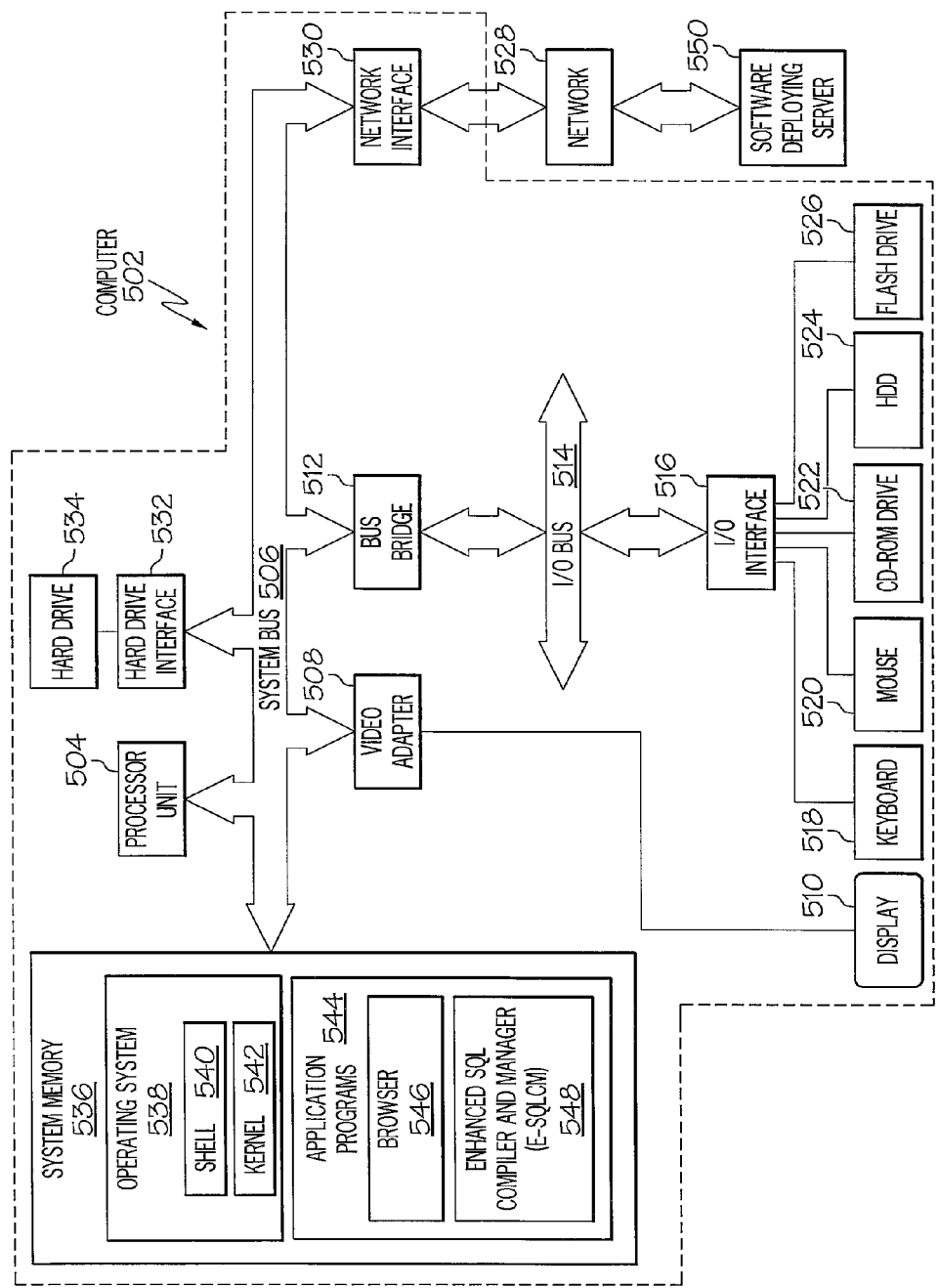
FIG. 5 illustrates an exemplary computer in which the present invention may be utilized.

With reference now to FIG. 5, there is depicted a block diagram of an exemplary computer 502, in which the present invention may be utilized. Note that some or all of the exemplary architecture shown for computer 502 may be utilized by software deploying server 550.

Computer 502 includes a processor unit 504 that is coupled to a system bus 506. A video adapter 508, which drives/supports a display 510, is also coupled to system bus 506. System bus 506 is coupled via a bus bridge 512 to an Input/Output (I/O) bus 514. An I/O interface 516 is coupled to I/O bus 514. I/O interface 516 affords communication with various I/O devices, including a keyboard 518, a mouse 520, a Compact Disk-Read Only Memory (CD-ROM) drive 522, a Hard Disk Drive (HDD) 524, and a Flash Drive 526. The format of the ports connected to I/O interface 516 may be any known to those skilled in the art of computer architecture, including but not limited to Universal Serial Bus (USB) ports.

Computer 502 is able to communicate with a software deploying server 550 via a network 528 using a network interface 530, which is coupled to system bus 506. Network 528 may be an external network such as the Internet, or an internal network such as an Ethernet or a Virtual Private Network (VPN).

A hard drive interface 532 is also coupled to system bus 506. Hard drive interface 532 interfaces with a hard drive 534. In a preferred embodiment, hard drive 534 populates a system memory 536, which is also coupled to system bus 506. System memory is defined as a lowest level of volatile memory in computer 502. This volatile memory includes additional higher levels of volatile memory (not shown), including, but not limited to, cache memory, registers and buffers. Data that populates system memory 536 includes computer 502's operating system (OS) 538 and application programs 544.

OS 538 includes a shell 540, for providing transparent user access to resources such as application programs 544. Generally, shell 540 is a program that provides an interpreter and an interface between the user and the operating system. More specifically, shell 540 executes commands that are entered into a command line user interface or from a file. Thus, shell 540 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 542) for processing. Note that while shell 540 is a text-based, line-oriented user interface, the present invention will equally well support other user interface modes, such as graphical, voice, gestural, etc.

As depicted, OS 538 also includes kernel 542, which includes lower levels of functionality for OS 538, including providing essential services required by other parts of OS 538 and application programs 544, including memory management, process and task management, disk management, and mouse and keyboard management.

Application programs 544 include a browser 546. Browser 546 includes program modules and instructions enabling a World Wide Web (WWW) client (i.e., computer 502) to send and receive network messages to the Internet using HyperText Transfer Protocol (HTTP) messaging, thus enabling communication with software deploying server 550 and other described computer systems.

Application programs 544 in computer 502's system memory (as well as software deploying server 550's system memory) also include an Enhanced SQL Compiler and Manager (E-SQLCM) 548. E-SQLCM 548 includes code for implementing the processes described in FIGS. 1-4 and 6A-7B, including the database management system 102, the enhanced SQL compiler 114, the SQL alias manager 108, and the SQL interface 106 depicted in FIG. 1. In one embodiment, computer 502 is able to download E-SQLCM 548 from software deploying server 550.

The hardware elements depicted in computer 502 are not intended to be exhaustive, but rather are representative to highlight essential components required by the present invention. For instance, computer 502 may include alternate memory storage devices such as magnetic cassettes, Digital Versatile Disks (DVDs), Bernoulli cartridges, and the like. These and other variations are intended to be within the spirit and scope of the present invention.

Note further that, in a preferred embodiment of the present invention, software deploying server 550 performs all of the functions associated with the present invention (including execution of E-SQLCM 548), thus freeing computer 502 from having to use its own internal computing resources to execute E-SQLCM 548.

It should be understood that at least some aspects of the present invention may alternatively be implemented in a computer-readable medium that contains a program product. Programs defining functions of the present invention can be delivered to a data storage system or a computer system via a variety of tangible signal-bearing media, which include, without limitation, non-writable storage media (e.g., CD-ROM), writable storage media (e.g., hard disk drive, read/write CD ROM, optical media), as well as non-tangible communication media, such as computer and telephone networks including Ethernet, the Internet, wireless networks, and like network systems. It should be understood, therefore, that such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

Software Deployment

As described above, in one embodiment, the processes described by the present invention, including the functions of E-SQLCM 548, are performed by service provider server 550. Alternatively, E-SQLCM 548 and the method described herein, and in particular as shown and described in FIGS. 1-4, can be deployed as a process software from service provider server 550 to computer 502. Still more particularly, process software for the method so described may be deployed to service provider server 550 by another service provider server (not shown).

Figure 6A:
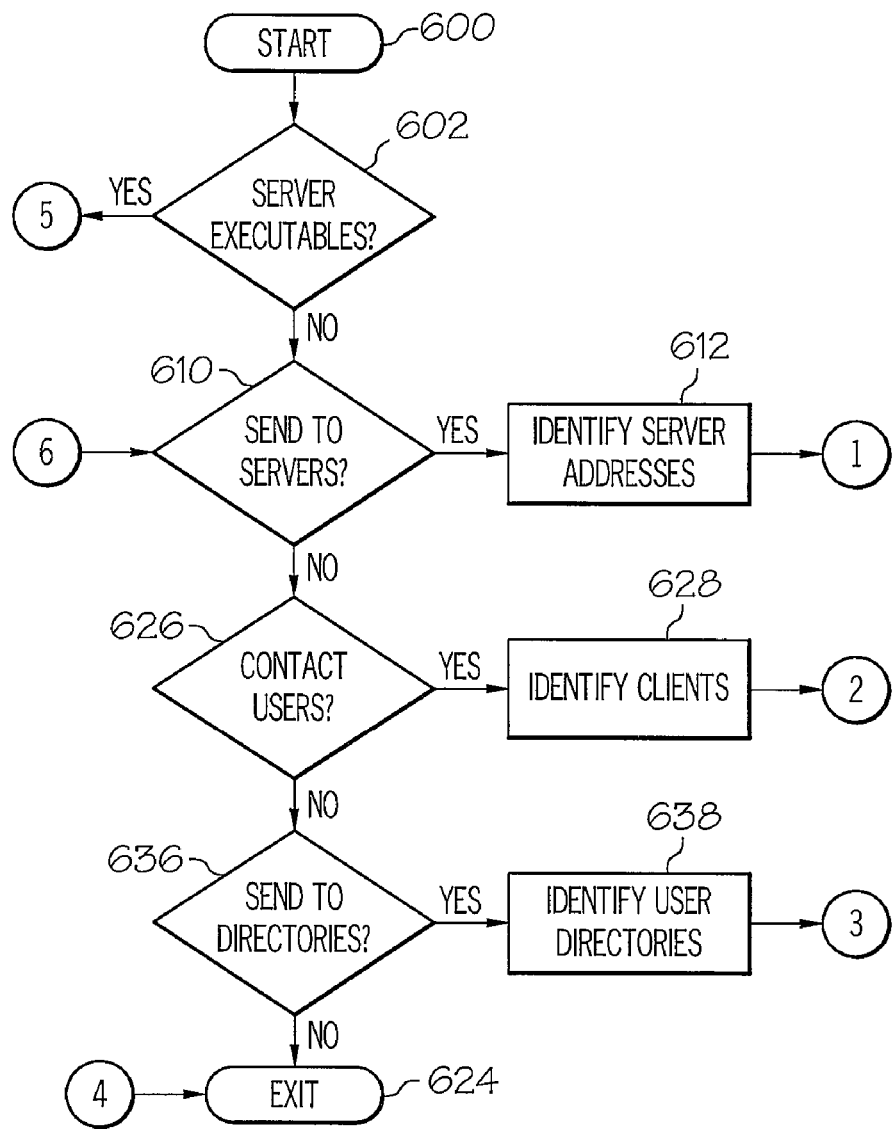
FIGS. 6A-B are flow-charts showing steps taken to deploy software capable of executing the steps described in FIGS. 1-4.
Figure 6B:
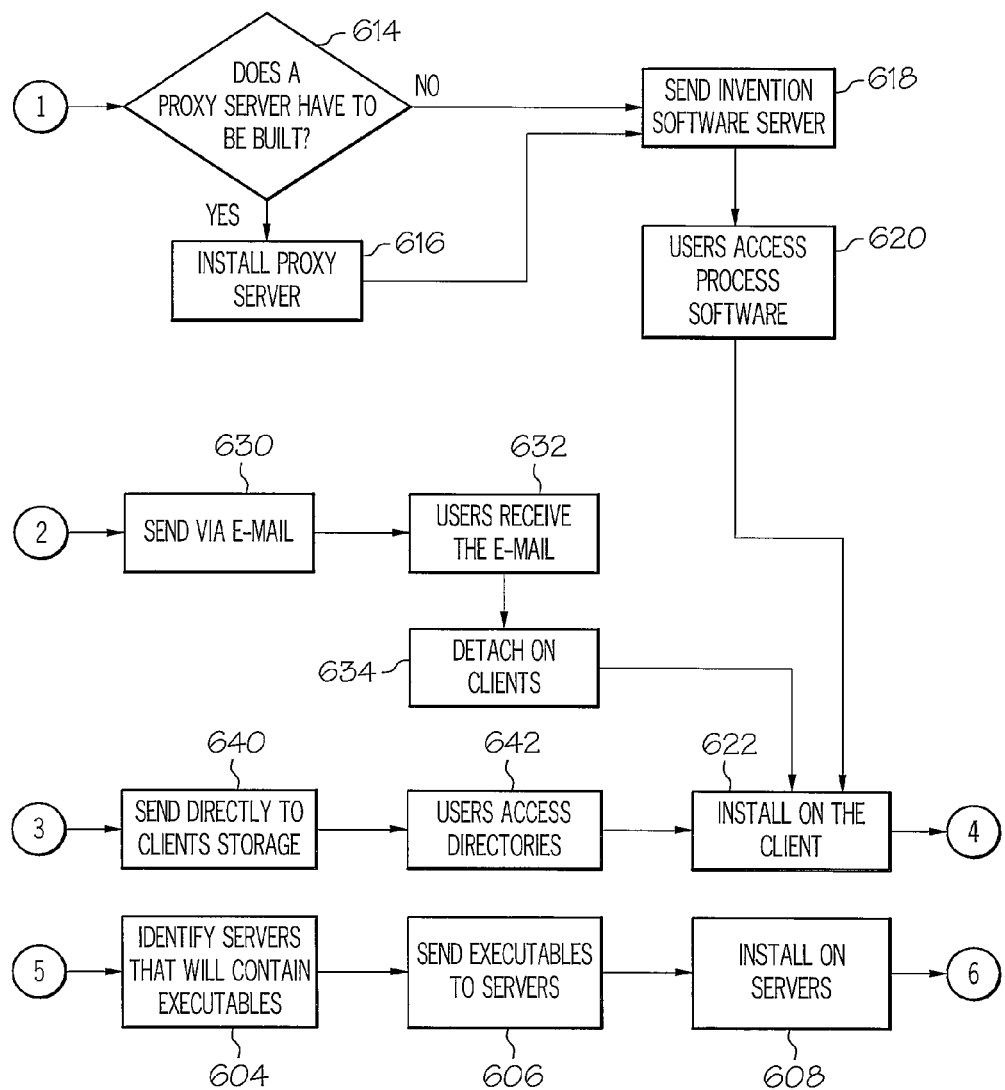

Referring then to FIGS. 6A-B, step 600 begins the deployment of the process software. The first thing is to determine if there are any programs that will reside on a server or servers when the process software is executed (query block 602). If this is the case, then the servers that will contain the executables are identified (block 604). The process software for the server or servers is transferred directly to the servers' storage via File Transfer Protocol (FTP) or some other protocol or by copying though the use of a shared file system (block 606). The process software is then installed on the servers (block 608).

Next, a determination is made on whether the process software is to be deployed by having users access the process software on a server or servers (query block 610). If the users are to access the process software on servers, then the server addresses that will store the process software are identified (block 612).

A determination is made if a proxy server is to be built (query block 614) to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required, then the proxy server is installed (block 616). The process software is sent to the servers either via a protocol such as FTP or it is copied directly from the source files to the server files via file sharing (block 618). Another embodiment would be to send a transaction to the servers that contained the process software and have the server process the transaction, then receive and copy the process software to the server's file system. Once the process software is stored at the servers, the users, via their computers, then access the process software on the servers and copy to their computers file systems (block 620). Another embodiment is to have the servers automatically copy the process software to each client and then run the installation program for the process software at each computer. The user executes the program that installs the process software on his computer (block 622) then exits the process (terminator block 624).

In query step 626, a determination is made whether the process software is to be deployed by sending the process software to users via e-mail. The set of users where the process software will be deployed are identified together with the addresses of the user computers (block 628). The process software is sent via e-mail to each of the users' computers (block 630). The users then receive the e-mail (block 632) and then detach the process software from the e-mail to a directory on their computers (block 634). The user executes the program that installs the process software on his computer (block 622) then exits the process (terminator block 624).

Lastly a determination is made as to whether the process software will be sent directly to user directories on their computers (query block 636). If so, the user directories are identified (block 638). The process software is transferred directly to the user's computer directory (block 640). This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software (block 642). The user executes the program that installs the process software on his computer (block 622) and then exits the process (terminator block 624).

VPN Deployment

The present software can be deployed to third parties as part of a service wherein a third party VPN service is offered as a secure deployment vehicle or wherein a VPN is build on-demand as required for a specific deployment.

A virtual private network (VPN) is any combination of technologies that can be used to secure a connection through an otherwise unsecured or untrusted network. VPNs improve security and reduce operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee. Access to the software via a VPN can be provided as a service by specifically constructing the VPN for purposes of delivery or execution of the process software (i.e. the software resides elsewhere) wherein the lifetime of the VPN is limited to a given period of time or a given number of deployments based on an amount paid.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a company's multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Software Integration

The process software which consists of code for implementing the process described herein may be integrated into a client, server and network environment by providing for the process software to coexist with applications, operating systems and network operating systems software and then installing the process software on the clients and servers in the environment where the process software will function.

The first step is to identify any software on the clients and servers, including the network operating system where the process software will be deployed, that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists match the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

On Demand

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units describe an example that represents but one measurement of use. Other measurements of use include but are not limited to network bandwidth, memory utilization, storage utilization, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory utilization, storage utilization, etc. approach a capacity so as to affect performance, additional network bandwidth, memory utilization, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and/or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 7A:
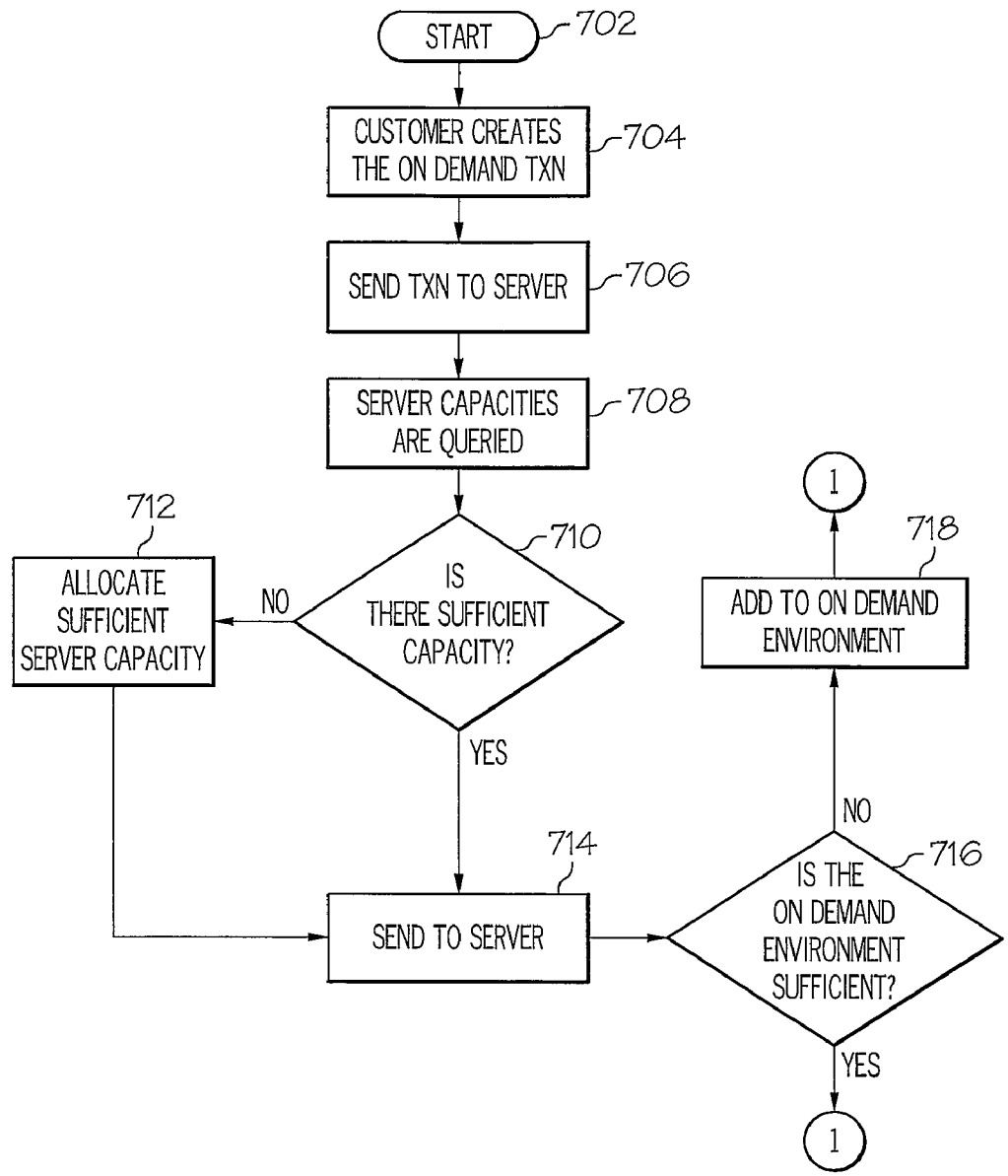
FIGS. 7A-B are flow-charts showing steps taken to execute the steps shown in FIGS. 1-4 using an on-demand service provider.
Figure 7B:
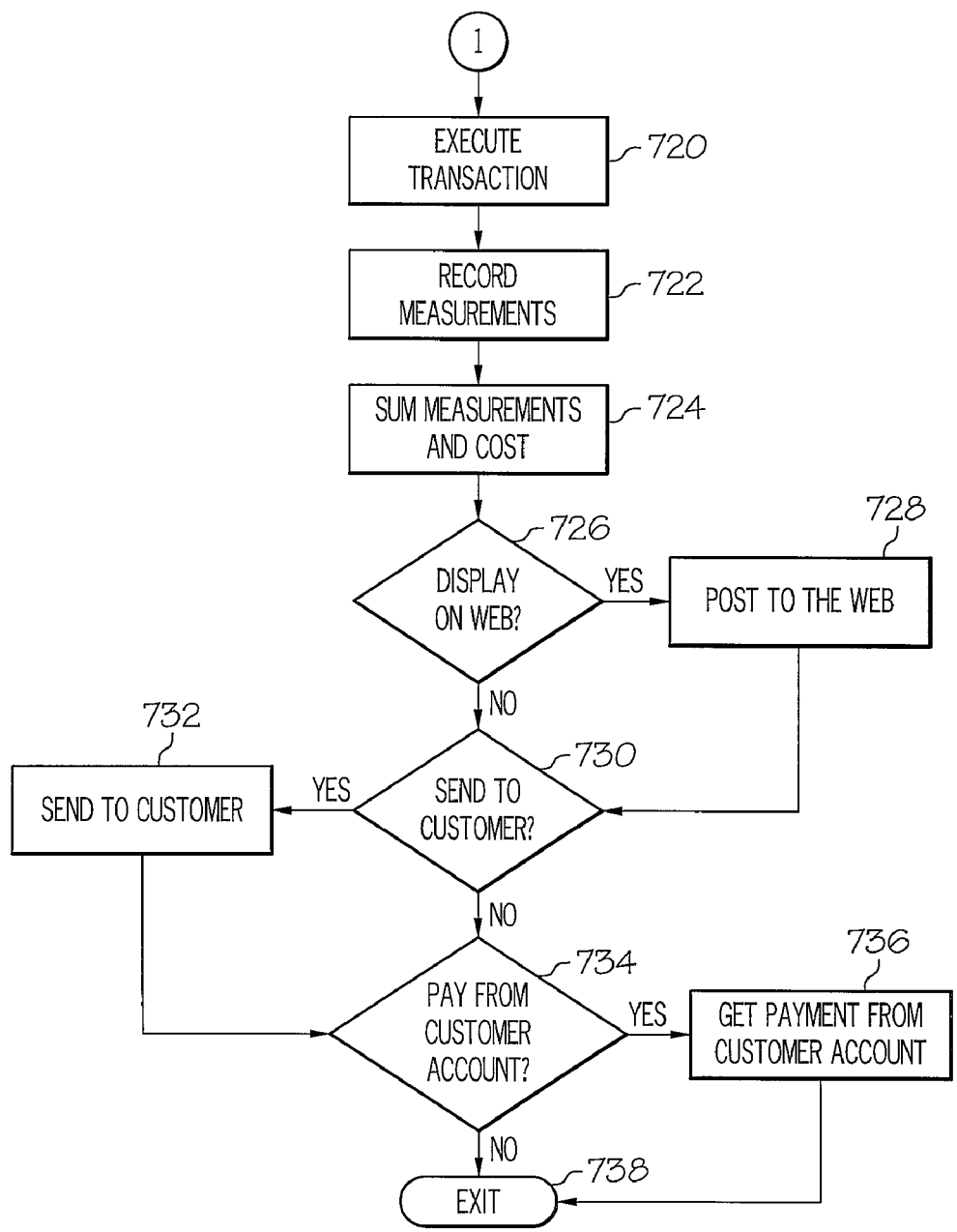

With reference now to FIGS. 7A-B, initiator block 702 begins the On Demand process. A transaction is created than contains the unique customer identification, the requested service type and any service parameters that further specify the type of service (block 704). The transaction is then sent to the main server (block 706). In an On Demand environment the main server can initially be the only server, then as capacity is consumed other servers are added to the On Demand environment.

The server central processing unit (CPU) capacities in the On Demand environment are queried (block 708). The CPU requirement of the transaction is estimated, then the server's available CPU capacity in the On Demand environment are compared to the transaction CPU requirement to see if there is sufficient CPU available capacity in any server to process the transaction (query block 710). If there is not sufficient server CPU available capacity, then additional server CPU capacity is allocated to process the transaction (block 712). If there was already sufficient available CPU capacity then the transaction is sent to a selected server (block 714).

Before executing the transaction, a check is made of the remaining On Demand environment to determine if the environment has sufficient available capacity for processing the transaction. This environment capacity consists of such things as but not limited to network bandwidth, processor memory, storage etc. (block 716). If there is not sufficient available capacity, then capacity will be added to the On Demand environment (block 718). Next the required software to process the transaction is accessed, loaded into memory, then the transaction is executed (block 720).

The usage measurements are recorded (block 722). The utilization measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer (block 724).

If the customer has requested that the On Demand costs be posted to a web site (query block 726), then they are posted (block 728). If the customer has requested that the On Demand costs be sent via e-mail to a customer address (query block 730), then these costs are sent to the customer (block 732). If the customer has requested that the On Demand costs be paid directly from a customer account (query block 734), then payment is received directly from the customer account (block 736). The On Demand process is then exited at terminator block 738.

As described herein, the present invention allows for the creation of a single SQL statement that permits the bundling of multiple swap requests into a single unit of work, such that an entire set of tables in a relational database is kept together and data integrity is maintained. The user is also given the opportunity, with appropriate authority, to force off previous users of the relational database by swapping out those user's alias names for objects in the database.

In one embodiment, the novel SQL statement utilizes the syntax of:

SWAP ALIASGROUPS
 {alias-n becomes object-n} (multiple iterations permitted)
 {with force} (optional parameter that would force any user off of the object if they were using it)

A database management system, e.g., DB2, can then determine if the issuer of the SQL was authorized to swap alias(es) (with or without force entitlements) for one or more groups of data. If the issuer of the command was authorized, and force was not used as a parameter, then usage of the alias(es) is checked. If the alias are locked, then the "Swap Alias" SQL command fails, and an error code is returned. If the issuer of the command was authorized, and the force was used as a parameter, then any users of the alias(es) would be forced off and would receive an error code indicating the force.

While the present invention has been particularly shown and described with reference to a preferred embodiment, it will be understood by those skilled in the art that various changes in form and detail may be made therein without departing from the spirit and scope of the invention. For example, while the present description has been directed to a preferred embodiment in which custom software applications are developed, the invention disclosed herein is equally applicable to the development and modification of application software. Furthermore, as used in the specification and the appended claims, the term "computer" or "system" or "computer system" or "computing device" includes any data processing system including, but not limited to, personal computers, servers, workstations, network computers, main frame computers, routers, switches, Personal Digital Assistants (PDA's), telephones, and any other system capable of processing, transmitting, receiving, capturing and/or storing data.

What is claimed is:

1. A method for swapping multiple alias names for multiple objects in a database management system via execution of a single command, the method comprising:

compiling a Structured Query Language (SQL) swap alias command to create a compiled SQL swap alias command, wherein the single SQL swap alias command is a single SQL statement that comprises a list of multiple different objects whose aliases are to be swapped and which, when compiled and executed, causes a global alias swap of at least one alias name swap for different objects among the multiple different objects in the database management system, wherein the global alias swap of the at least one alias name swap for the multiple different objects is triggered by execution of the compiled SQL swap alias command; and issuing the compiled SQL swap alias command to an SQL interface for the database management system, wherein the compiled SQL swap alias command performs the steps of:

in response to determining that an issuer of the swap alias command is authorized to issue the SQL swap alias command, determining if a particular alias name, for one of the multiple objects, is locked to prevent changing the particular alias name;

in response to determining that the particular alias name is locked, determining if the issuer of the swap alias command has an authority to force the alias name swap of the particular alias name;

in response to determining that the issuer has the authority to force the alias name swap of the particular alias name, swapping multiple alias names including the particular alias name and all non-locked alias names for the multiple objects in the database management system, wherein said swapping is performed as a global alias swap via execution of the compiled SQL swap alias command generated from the single SQL swap alias command;

when the issuer does not have the authority to force the alias name swap of the particular alias name:

issuing an error message if the SQL swap alias command fails because the issuer is not authorized to force the alias name swap of the particular object; and swapping only the alias names of each of multiple other objects whose alias names are non-locked or for which the issuer has authority to force the alias name swap, wherein said swapping is performed as a global alias swap via execution of the compiled SQL swap alias command generated from the single SQL swap alias command.

2. The method of claim 1, wherein the database management system is a DB2 system.

3. The method of claim 1, wherein the multiple objects are tables of data in the database management system.

4. The method of claim 1, further comprising: issuing an error message if the swap alias command fails because the issuer is not authorized to issue the SQL swap alias command.

5. The method of claim 1, wherein the SQL swap alias command has a syntax of "SWAP ALIASGROUPS [alias_n becomes object.sub.-n] [multiple iterations] [force]", wherein "alias_n" defines an alias name that is redirected to point to "object_n", "multiple iterations" defines that the swap alias command is to be applied to multiple objects in the database management system, wherein one or more [alias_x becomes object_x] can be defined, and "force" defines whether the command is to force the alias name swap.

6. A system comprising:

a processor;

a data bus coupled to the processor;

a memory coupled to the data bus; and a computer-usable medium embodying computer program code, the computer program code comprising instructions executable by the processor and configured for swapping multiple alias names for multiple objects in a database management system by performing the steps of:

compiling a single Structured Query Language (SQL) swap alias command to create a compiled SQL swap alias command, wherein the single SQL swap alias command is a single SQL statement that comprises a list of multiple different objects whose aliases are to be swapped and which, when compiled and executed, causes a global alias swap of at least one alias name swap for different objects among the multiple different objects in the database management system, wherein the global alias swap of the at least one alias name swap for the multiple different objects is triggered by execution of the compiled SQL swap alias command; and issuing the compiled SQL swap alias command to an SQL interface for the database management system, wherein the compiled SQL swap alias command performs the steps of:

in response to determining that an issuer of the swap alias command is authorized to issue the SQL swap alias command, determining if a particular underlying object, for a particular alias name, is locked to prevent changing the particular alias name;

in response to determining that the particular alias name is locked, determining if the issuer of the swap alias command has an authority to force the alias name swap of the particular alias name;

in response to determining that the issuer has the authority to force the alias name swap of the particular alias name, swapping alias names of the particular alias name for the multiple objects in the database management system that have been listed in the single SQL swap alias command, thereby forcing all locked resources to be freed, wherein said swapping is performed as a global alias swap via execution of the compiled SQL swap alias command generated from the single SQL swap alias command;
when the issuer does not have the authority to force the alias name swap of the particular alias name:
issuing an error message if the SQL swap alias command fails because the issuer is not authorized to force the alias name swap of the particular object; and
swapping only the alias names of each of multiple other objects whose alias names are non-locked or for which the issuer has authority to force the alias name swap, wherein said swapping is performed as a global alias swap via execution of the compiled SQL swap alias command generated from the single SQL swap alias command.

7. The system of claim 6, wherein the database management system is a DB2 system.

8. The system of claim 6, wherein the multiple objects are tables of data in the database management system.

9. The system of claim 6, wherein the instructions are further configured for:issuing an error message if the SQL swap alias command fails because the issuer is not authorized to issue the swap alias command.

10. The system of claim 6, wherein the SQL swap alias command has a syntax of "SWAP ALIASGROUPS [alias_n becomes object_n] [multiple iterations] [force]", wherein "alias_n" defines an alias name that is redirected to point to "object_n", "multiple iterations" defines that the swap alias command is to be applied to multiple objects in the database management system, wherein one or more [alias_x becomes object_x] can be defined, and "force" defines whether the command is to force the alias name swap.

11. A computer-readable medium on which is stored a Structured Query Language (SQL) swap alias command, wherein the SQL swap alias command is a single SQL statement that comprises a list of multiple different objects whose aliases are to be swapped and which, when compiled and executed, causes a global alias name swap for multiple objects in a database management system;
wherein the SQL swap alias command, when compiled and issued as a compiled SQL swap alias command to an SQL interface for the database management system, performs the steps of:
in response to determining that an issuer of the SQL swap alias command is authorized to issue the SQL swap alias command, determining if a particular alias name, for one of the multiple objects, is locked to prevent changing the particular alias name to point to a different underlying table/view;
in response to determining that the particular alias name is locked, determining if the issuer of the swap alias command has an authority to force the alias name swap of the particular alias name;
in response to determining that the issuer has the authority to force the alias name swap of the particular alias name:
swapping alias names for all objects using the particular alias name in the database management system; and
concurrently swapping multiple alias names of all non-locked alias names for the multiple objects in the database management system, wherein said swapping is performed as a global alias swap;
when the issuer does not have the authority to force the alias name swap of the particular alias name:
issuing an error message if the SQL swap alias command fails because the issuer is not authorized to force the alias name swap; and
swapping only the alias names of each of multiple other objects whose alias names are non-locked or for which the issuer has authority to force the alias name swap, wherein said swapping is performed as a global alias swap via execution of the compiled SQL swap alias command generated from the single SQL swap alias command.

12. The computer-readable medium of claim 11, wherein the SQL swap alias command, when compiled, performs the step of: issuing an error message if the SQL swap alias command fails because the issuer is not authorized to issue the swap alias command.

13. The computer-readable medium of claim 11, wherein the database management system is a DB2 system.

14. The computer-readable medium of claim 11, wherein the SQL swap alias command has a syntax of "SWAP ALIASGROUPS [alias_n becomes object_n] [multiple iterations] [force]", wherein "alias_n" defines an old alias name that is replaced with a new alias name "object_n", "multiple iterations" defines that the swap alias command is to be applied to multiple objects in the database management system, and "force" defines whether the command is to force the alias name swap.

15. The computer-readable medium of claim 11, wherein the computer-usable medium is a component of a remote server, and wherein the computer executable instructions are deployable to a local computer from the remote server.

16. The computer-readable medium of claim 11, wherein the computer executable instructions are capable of being provided by a service provider to a customer on an on-demand.

* * * * *